United States Patent
Mikami et al.

(10) Patent No.: US 11,990,726 B2
(45) Date of Patent: May 21, 2024

(54) OPTICAL REPEATER, MANUFACTURING METHOD OF OPTICAL REPEATER, AND RELAY METHOD OF OPTICAL SIGNAL

(71) Applicant: NEC Corporation, Tokyo (JP)

(72) Inventors: Satoshi Mikami, Tokyo (JP); Eduardo Mateo Rodriguez, Tokyo (JP)

(73) Assignee: NEC CORPORATION, Tokyo (JP)

( * ) Notice: Subject to any disclaimer, the term of this patent is extended or adjusted under 35 U.S.C. 154(b) by 913 days.

(21) Appl. No.: 16/979,746

(22) PCT Filed: Dec. 17, 2018

(86) PCT No.: PCT/JP2018/046309
§ 371 (c)(1),
(2) Date: Sep. 10, 2020

(87) PCT Pub. No.: WO2019/176205
PCT Pub. Date: Sep. 19, 2019

(65) Prior Publication Data
US 2021/0044075 A1   Feb. 11, 2021

(30) Foreign Application Priority Data
Mar. 13, 2018   (JP) .................................. 2018-045417

(51) Int. Cl.
*H01S 3/094*        (2006.01)
*H01S 3/091*        (2006.01)
(Continued)

(52) U.S. Cl.
CPC ...... *H01S 3/094061* (2013.01); *H01S 3/0912* (2013.01); *H01S 3/094038* (2013.01);
(Continued)

(58) Field of Classification Search
CPC . H04B 10/29; H04B 10/291; H01S 3/094061; H01S 3/2383; H01S 3/0912; H01S 3/094038; H01S 3/2308
See application file for complete search history.

(56) References Cited

U.S. PATENT DOCUMENTS 6,654,162 B2 * 11/2003 Akasaka ........... H01S 3/094096
372/6
6,980,576 B2   12/2005 Frolov et al.
(Continued)

FOREIGN PATENT DOCUMENTS

EP    3358761 A1    8/2018
JP    H4-234738 A   8/1992
(Continued)

OTHER PUBLICATIONS

Extended European Search Report for EP Application No. 18909278.6 dated Apr. 13, 2021.
(Continued)

*Primary Examiner* — Omar S Ismail

(57) ABSTRACT

The object is to provide an optical repeater, a manufacturing method of an optical repeater, and a relay method of an optical signal that can achieve a redundant configuration for a failure of a light source outputting an excitation light with a simple configuration. Light sources output lights. The optical amplification units amplify optical signals using excitation lights. An optical distribution unit branches the lights output from the light sources into two branched lights and distributes the branched lights in such a manner that each of the optical amplification units receives the branched light branched from the lights from two different light sources as the excitation light.

6 Claims, 13 Drawing Sheets

(51) Int. Cl.
*H01S 3/23* (2006.01)
*H04B 10/29* (2013.01)
*H04B 10/291* (2013.01)

(52) U.S. Cl.
CPC .......... *H01S 3/2308* (2013.01); *H01S 3/2383* (2013.01); *H04B 10/29* (2013.01); *H04B 10/291* (2013.01)

(56) References Cited

U.S. PATENT DOCUMENTS

| | | | | |
|---|---|---|---|---|
| 7,054,559 | B1* | 5/2006 | Le | H04B 10/2972 |
| | | | | 398/79 |
| 8,818,189 | B2* | 8/2014 | Izumi | H04J 14/0221 |
| | | | | 398/28 |
| 11,539,443 | B2* | 12/2022 | Hand | H04J 14/0227 |
| 11,777,634 | B2* | 10/2023 | Al Sayeed | H04J 14/0227 |
| | | | | 398/48 |
| 2003/0048524 | A1* | 3/2003 | Chavez-Pirson | H01S 3/063 |
| | | | | 359/333 |
| 2004/0175180 | A1* | 9/2004 | Sugaya | H04J 14/0221 |
| | | | | 398/85 |
| 2005/0226622 | A1 | 10/2005 | Trischitta et al. | |
| 2006/0140633 | A1* | 6/2006 | Chaput | H04B 10/298 |
| | | | | 398/92 |
| 2017/0311060 | A1* | 10/2017 | Cai | H04Q 11/0062 |
| 2018/0219632 | A1* | 8/2018 | Yoshida | H04B 10/5161 |

FOREIGN PATENT DOCUMENTS

| | | |
|---|---|---|
| JP | 2002-221742 A | 8/2002 |
| WO | WO-2017/056438 A1 | 4/2017 |
| WO | 2018/097075 A1 | 5/2018 |

OTHER PUBLICATIONS

International Search Report corresponding to PCT/JP2018/046309 dated Mar. 12, 2019 (one page).
Japanese Office Communication for JP Application No. 2020-505594 dated Jul. 20, 2021 with English Translation.

* cited by examiner

OPTICAL REPEATER, MANUFACTURING METHOD OF OPTICAL REPEATER, AND RELAY METHOD OF OPTICAL SIGNAL

CROSS REFERENCE TO RELATED APPLICATIONS

This application is a national stage application of International Application No. PCT/JP2018/046309 entitled "Optical Relay, Optical Relay Production Method, and Optical Signal Relay Method" filed on Dec. 17, 2018, which claims priority to Japanese Patent Application No. JP2018-045417 filed on Mar. 13, 2018, the disclosures of which are hereby incorporated by reference in their entirety.

TECHNICAL FIELD

The present invention relates to an optical repeater, a manufacturing method of an optical repeater, and a relay method of an optical signal.

BACKGROUND ART

In an optical communication system such as a submarine optical cable system, at least one optical repeater is inserted in a transmission path so as to compensate attenuation of an optical signal. The optical repeater includes an optical amplifier that amplifies the optical signal. As such an optical amplifier, an Erbium-doped fiber amplifier (EDFA) capable of directly amplifying the optical signal is used.

A fiber-type optical amplification apparatus including the EDFA has been proposed (Patent Literature 1). In the fiber-type optical amplification apparatus, eight excitation light sources are disposed for eight Erbium-doped fiber (EDF) units. An excitation light output from each excitation light source is equally branched into eight lights by a fiber coupler and the branched eight lights are distributed to the eight EDF units. In this configuration, the light output from one excitation light source is distributed to the eight EDF units by passing through two-input/two-output distributor three times. That is, the fiber-type optical amplification apparatus employs a redundant configuration in which each EDF unit receives the excitation light output from each excitation light source by ⅛.

Thus, even when the excitation light source fails and the output of the excitation light is stopped, it is possible to suppress a decrease in a level of the excitation light received by the EDF unit and control the output of the excitation light source that does not fail so as to restore the level of the excitation light received by the EDF unit.

CITATION LIST

Patent Literature

Patent Literature 1: Japanese Unexamined Patent Application Publication NO. H4-234738

SUMMARY OF INVENTION

Technical Problem

However, the fiber-type optical amplification apparatus described above has the following problems. In the fiber-type optical amplification apparatus, since the excitation light output from the excitation light source is equally branched by the number of the EDF units, many distributors are disposed in the fiber coupler and it is necessary to connect between the distributors by optical wiring. Therefore, a complicated wiring configuration to connect between the distributors is required and wiring work is also complicated. Especially, since the number of the distributors through which the light output from the excitation light source passes increases as the number of the EDF units increase, the wiring configuration becomes more complicated. The fiber-type optical amplification apparatus also has a prominent disadvantage that the failure of one excitation light source affects all EDF units.

The present disclosure has been made in view of the matters mentioned above and has an object to provide an optical repeater, a manufacturing method of an optical repeater, and a relay method of an optical signal that can achieve a redundant configuration for a failure of a light source outputting an excitation light with a simple configuration.

Solution to Problem

An aspect of the present invention is an optical repeater including: three or more light sources configured to output lights; three or more optical amplification units configured to amplify optical signals using input excitation lights; and an optical distribution unit configured to branch the light output from each of the three or more light sources into two branched lights and distribute the branched lights in such a manner that each of the three or more optical amplification units receives the branched lights branched from the lights from two different light sources as the excitation light.

An aspect of the present invention is a manufacturing method of an optical repeater including: disposing three or more light sources configured to output lights; disposing three or more optical amplification units configured to amplify optical signals using input excitation lights, and disposing an optical distribution unit between the three or more light sources and the three or more optical amplification units, the optical distribution unit being configured to branch the light output from each of the three or more light sources into two branched lights and distribute the branched lights in such a manner that each of the three or more optical amplification units receives the branched lights branched from the lights from two different light sources as the excitation light.

An aspect of the present invention is a relay method of an optical signal including: branching a light output from each of three or more light sources into two branched lights, and distributing the branched lights to three or more optical amplification units in such a manner that each of the three or more optical amplification units that amplifies an optical signal using input excitation lights receives the branched lights branched from the lights from two different light sources as the excitation light.

Advantageous Effects of Invention

According to the present disclosure, it is possible to provide an optical repeater, a manufacturing method of an optical repeater, and a relay method of an optical signal that can achieve a redundant configuration for a failure of a light source outputting an excitation light with a simple configuration.

DESCRIPTION OF EMBODIMENTS

Hereinbelow, example embodiments of the present disclosure are explained with reference to the drawings. The same symbols are assigned to the same elements throughout the drawings and duplicated explanations are omitted as necessary.

First example embodiment

Figure 1:
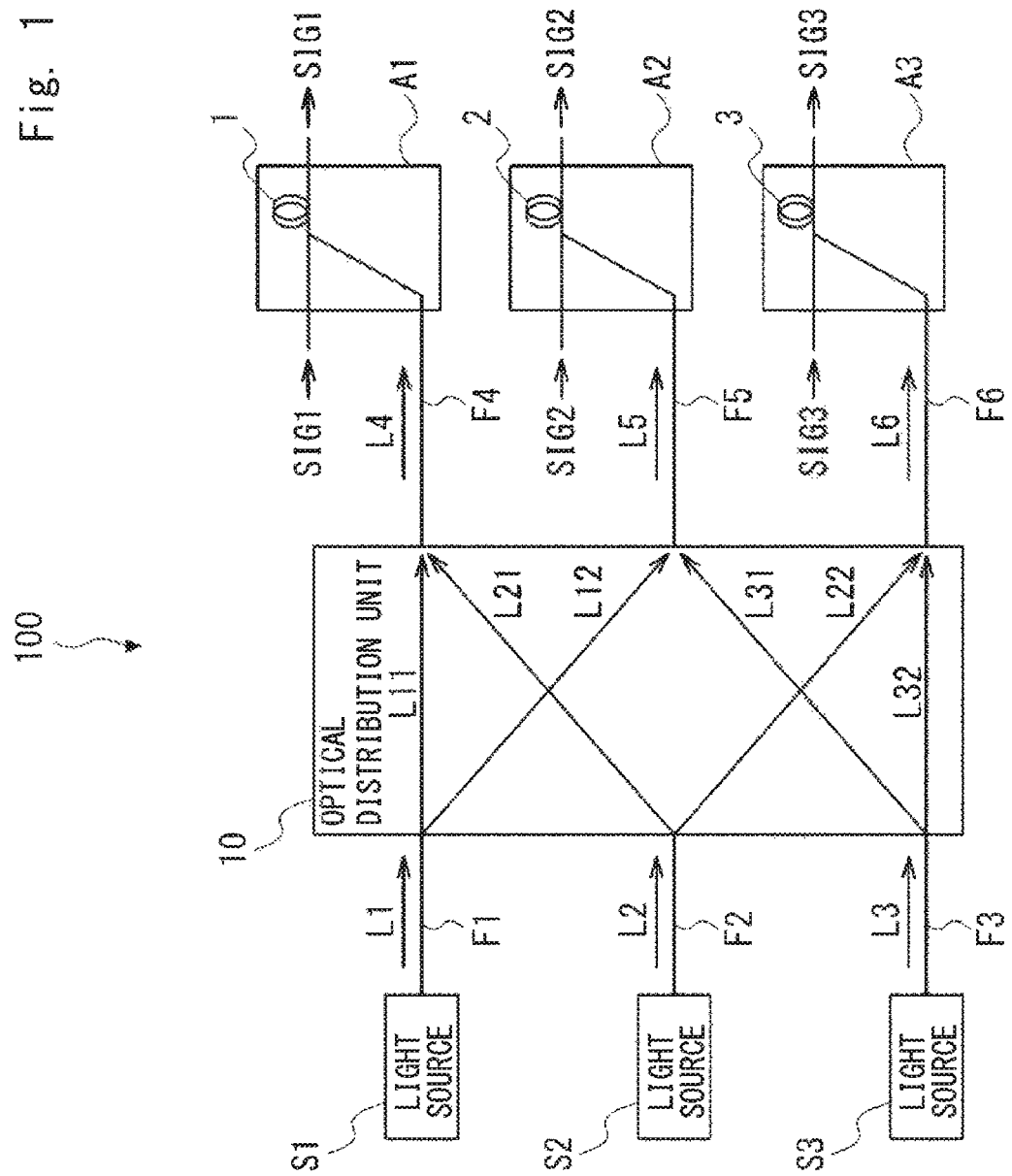
FIG. 1 schematically illustrates a configuration of an optical repeater according to a first example embodiment.

An optical repeater according to a first example embodiment will be described. FIG. 1 schematically illustrates a configuration of an optical repeater 100 according to the first example embodiment. The optical repeater 100 includes light sources S1 to S3, an optical distribution unit 10, and optical amplification units A1 to A3.

The light sources S1 to S3 output lights L1 to L3 through optical fibers F1 to F3 to the optical distribution unit 10, respectively.

The optical distribution unit 10 is configured as an optical distribution circuit that distributes the lights L1 to L3 to the optical amplification units A1 to A3. The optical distribution unit 10 branches each of the lights L1 to L3 into two branched lights. Specifically, the light L1 is branched into a branched light L11 and a branched light L12. The light L2 is branched into a branched light L21 and a branched light L22. The light L3 is branched into a branched light L31 and a branched light L32.

The optical distribution unit 10 distributes the branched lights L11, L12, L21, L22, L31, and L32 in such a manner that each of the optical amplification units A1 to A3 receives two branched lights output from the different light sources. Specifically, the optical distribution unit 10 outputs an excitation light L4 generated by multiplexing the branched light L11 and the branched light L21 to the optical amplification unit A1 through an optical fiber F4. The optical distribution unit 10 outputs an excitation light L5 generated by multiplexing the branched light L12 and the branched light L31 to the optical amplification unit A2 through an optical fiber F5. The optical distribution unit 10 outputs an excitation light L6 generated by multiplexing the branched light L22 and the branched light L32 to the optical amplification unit A3 through an optical fiber F6.

The optical amplification units A1 to A3 are configured as optical amplifiers directly amplifying optical signals SIG1 to SIG3 using the excitation lights L4 to L6, respectively. The optical amplification units A1 to A3 are configured to include Erbium-doped fiber amplifiers (EDFAs) in which Erbium-doped fibers (EDFs) 1 to 3 are disposed, respectively. When the excitation lights L4 to L6 are input to the EDFs 1 to 3 of the optical amplification units A1 to A3, the EDFs 1 to 3 are excited, respectively. Then, when the optical signals SIG1 to SIG3 are input to the excited EDFs 1 to 3, the optical signals SIG1 to SIG3 are amplified, respectively.

Figure 2:
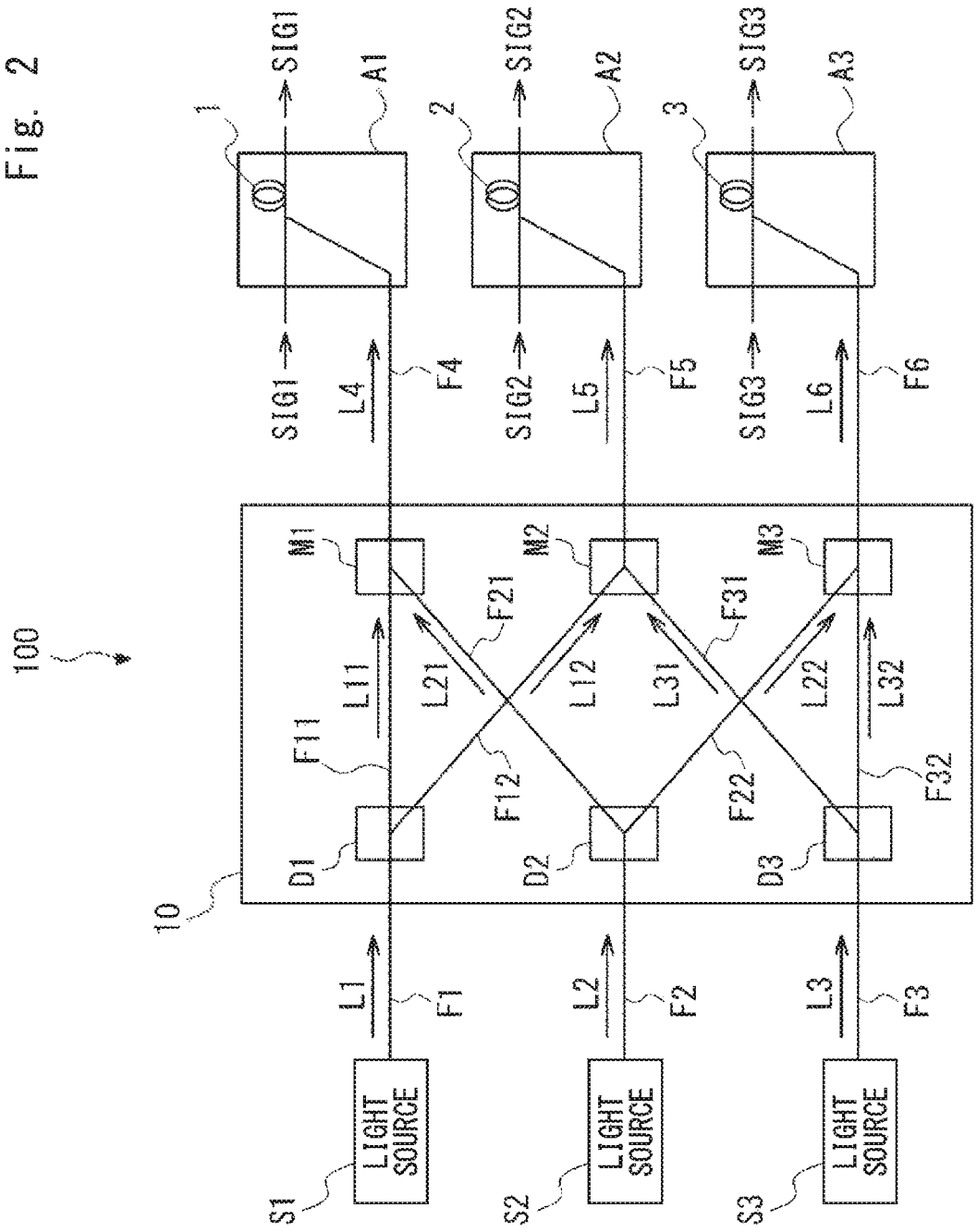
FIG. 2 illustrates the configuration of the optical repeater according to the first example embodiment in more detail.

The optical distribution unit 10 will be described below. FIG. 2 illustrates the configuration of the optical repeater 100 according to the first example embodiment in more detail.

The optical distribution unit 10 includes demultiplexers D1 to D3 and multiplexers M1 to M3.

The demultiplexers D1 to D3 are configured as a Y-branch that branches an input light into two lights. The multiplexers M1 to M3 are configured as a Y-branch that multiplexes two input lights.

The fiber F1 connects between the light source S1 and an input port of the demultiplexer D1. The fiber F2 connects between the light source S2 and an input port of the demultiplexer D2. The fiber F3 connects between the light source S3 and an input port of the demultiplexer D3.

One output port of the demultiplexer D1 and one input port of the multiplexer M1 are connected by an optical fiber F11. The other output port of the demultiplexer D1 and one input port of the multiplexer M2 are connected by an optical fiber F12. One output port of the demultiplexer D2 and the other input port of the multiplexer M1 are connected by an optical fiber F21. The other output port of the demultiplexer D2 and one input port of the multiplexer M3 are connected by an optical fiber F22. One output port of the demultiplexer D3 and the other input port of the multiplexer M2 are connected by an optical fiber F31. The other output port of the demultiplexer D3 and the other input port of the multiplexer M3 are connected by an optical fiber F32.

An output port of the multiplexer M1 and an input port of the optical amplification unit A1 are connected by the optical fiber F4. An output port of the multiplexer M2 and an input port of the optical amplification unit A2 are connected by the optical fiber F5. An output port of the multiplexer M3 and an input port of the optical amplification unit A3 are connected by the optical fiber F6.

Next, transmission paths of the light in the optical distribution unit 10 will be described. The demultiplexer D1 branches the light L1 into the branched light L11 and the branched light L12. The branched light L11 is output to the multiplexer M1 through the optical fiber F11. The branched light L12 is output to the multiplexer M2 through the optical fiber F12. The demultiplexer D2 branches the light L2 into the branched light L21 and the branched light L22. The branched light L21 is output to the multiplexer M1 through the optical fiber F21. The branched light L22 is output to the multiplexer M3 through the optical fiber F22. The demultiplexer D3 branches the light L3 into the branched light L31 and the branched light L32. The branched light L31 is output to the multiplexer M2 through the optical fiber F31. The branched light L32 is output to the multiplexer M3 through the optical fiber F32.

The multiplexer M1 multiplexes the branched light L11 and the branched light L21 so as to output the excitation light L4 to the optical amplification unit A1 through the optical fiber F4. The multiplexer M2 multiplexes the branched light L12 and the branched light L31 so as to output the excitation light L5 to the optical amplification unit A2 through the optical fiber F5. The multiplexer M3 multiplexes the branched light L22 and the branched light L32 so as to output the excitation light L6 to the optical amplification unit A3 through the optical fiber F6.

Figure 3:
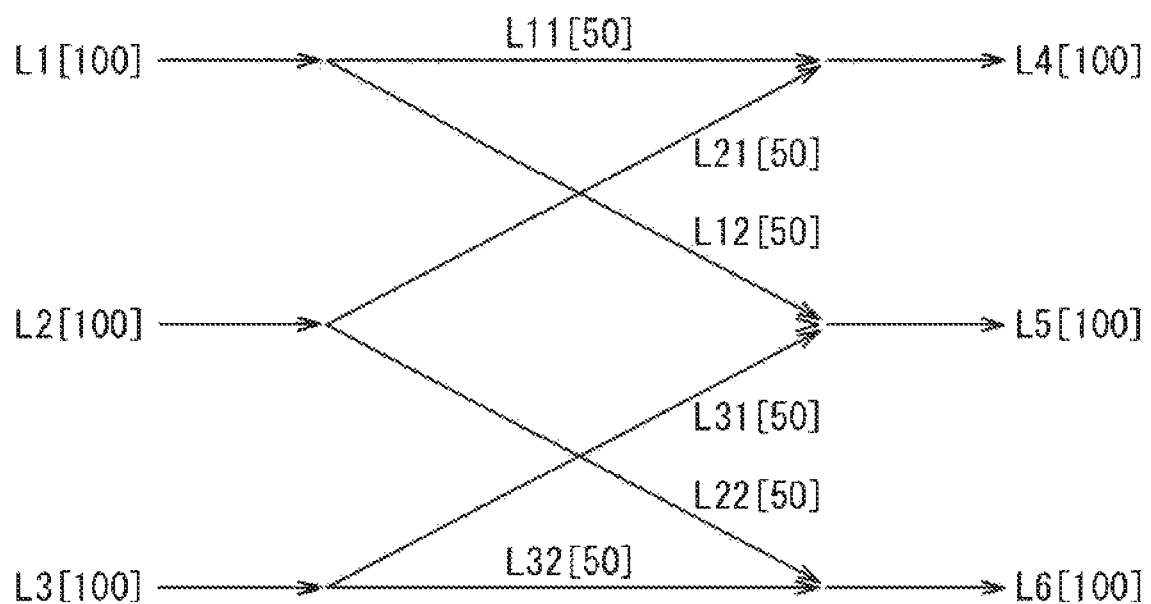
FIG. 3 schematically illustrates light intensities in the optical repeater according to the first example embodiment.

When the lights L1 to L3 have the same light intensity, and the demultiplexers D1 to D3 branch the lights L1 to L3 at the same rate, respectively, the excitation lights L4 to L6 have the same light intensity. FIG. 3 schematically illustrates the light intensities in the optical repeater 100 according to the first example embodiment. When the light intensity of each of the lights L1 to L3 is "100" and the demultiplexer D1 branches the lights L1 at the same rate, the light intensity of each of the branched light L11 and L12 is "50". Similarly, the light intensity of each of the branched light L21, L22, L31, and L32 is "50". Thus, the light intensity of each of the excitation lights L4 to L6 generated by multiplexing the two branched light is "100".

Figure 4:
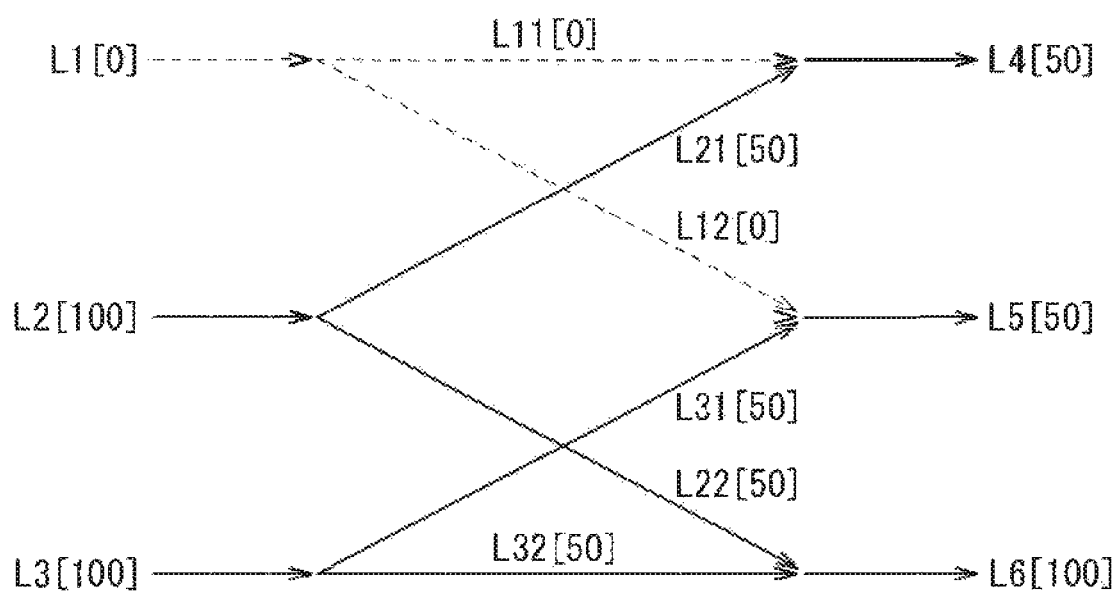
FIG. 4 illustrates an example in which a light source in the optical repeater according to the first example embodiment fails.

Next, the case in which the light source in the optical repeater 100 fails will be considered. FIG. 4 illustrates an example in which the light source S1 in the optical repeater 100 according to the first example embodiment fails. Since only the branched light L21 is output to the optical amplification unit A1 as the excitation light L4 when the light source S1 fails and the output of the light L1 stops, the light intensity of the excitation light L4 is "50". Further, since only the branched light L31 is output to the optical amplification unit A2 as the excitation light L5, the light intensity of the excitation light L5 is "50". The light intensity of the excitation light L6 is kept at "100".

Thus, since the optical repeater 100 has a redundant configuration that receives the lights from the two different light sources as the excitation light, even when one light source fails, the output of the excitation light to the optical amplification unit is not interrupted while the light intensity of the excitation light is reduced. Therefore, according to the present configuration, it is possible to provide the optical repeater capable of continuing to relay the optical signal even when the light source fails can be provided.

Figure 5:
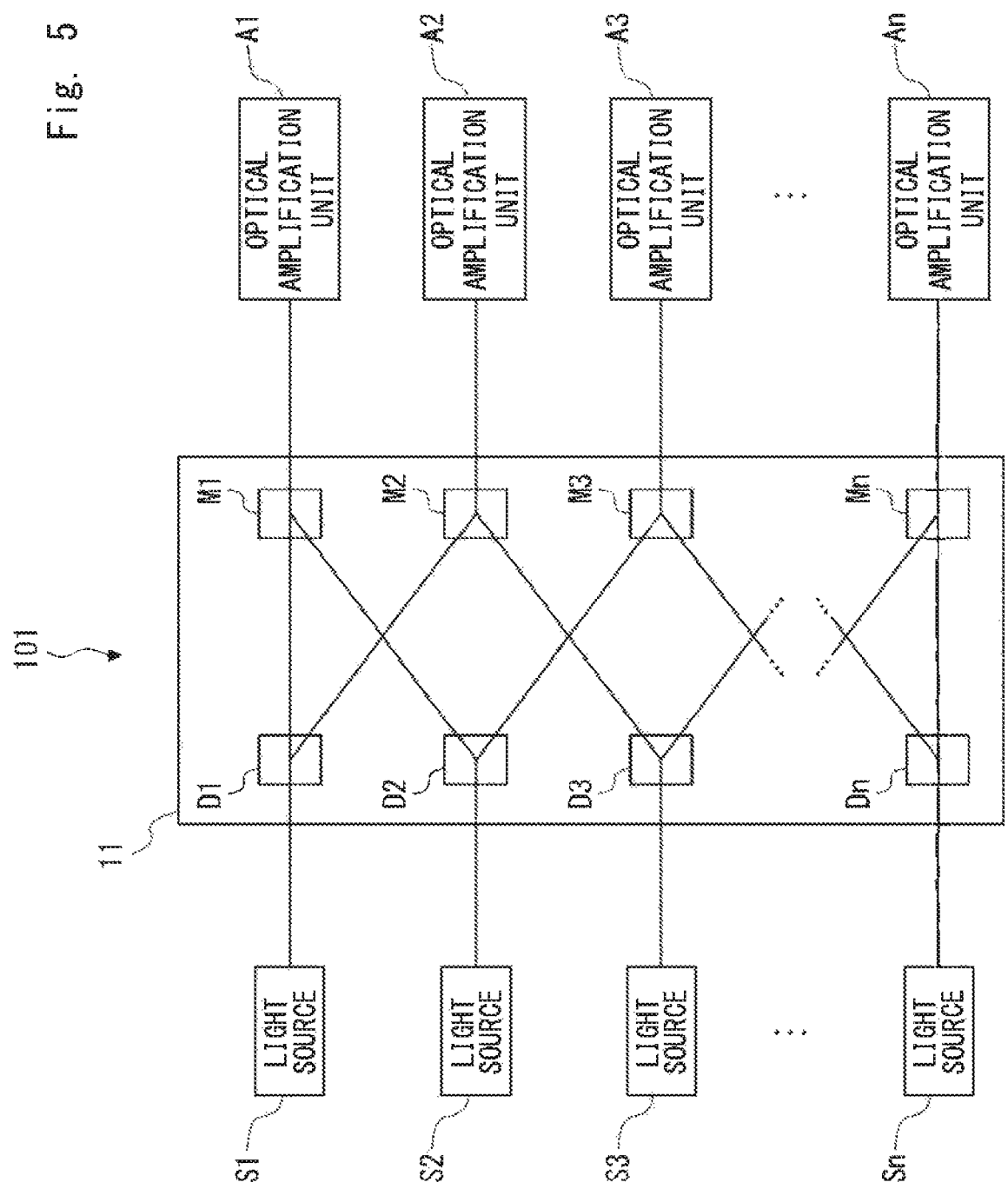
FIG. 5 illustrates an optical repeater including n light sources and n optical amplifiers, where n is an integer equal to or more than four.

In the above description, although an example in which the optical repeater includes three light sources and three optical amplifiers has been described, the number of the light sources and the number of the optical amplifiers are not limited to three. In sum, the optical repeater may include two, four, or more light sources, and two, four, or more optical amplifiers. FIG. 5 illustrates an optical repeater 101 including n light sources and n optical amplifiers, where n is an integer equal to or more than four.

The optical repeater 101 includes the light sources S1 to Sn, an optical distribution unit 11, and the optical amplification units A1 to An. The optical distribution unit 11 includes the demultiplexers D1 to Dn and the multiplexers M1 to Mn. As the optical distribution unit 10, the optical distribution unit 11 branches the light output from each of the light sources S1 to Sn into two branched light, and distributes the branched lights in such a manner that each of the optical amplification units A1 to An receives two branched light output from the different light sources.

Accordingly, as the optical repeater 100, since the optical repeater 101 has the redundant configuration in which the optical amplification unit receives the lights from two different light sources as the excitation light, the relay of the optical signal can be continued even if the light source fails.

In the present configuration, unlike Patent Literature 1, the total number of the demultiplexers and the multiplexers through which the light output from the light source passes is kept at two and thereby does not increase, even when the number of the optical amplification units increases. Thus, complicated optical wiring is not required. Therefore, the number of the light sources and the number of the optical amplifiers can be selected without considering the complexity of the optical wiring, and thereby flexible design can be performed as appropriate. Further, loss of the light due to the demultiplexers and the multiplexers can be suppressed by suppressing the total number of those. As a result, as compared to Patent Literature 1, it is possible to more effectively use the light output from the light source as the excitation light.

In the optical repeater according to the present example embodiment, even when one light source fails, the failure affects only a part of the optical amplification units. Therefore, it is possible to reduce the influence of the failure of the light source on the relay of the optical signal.

Figure 6:
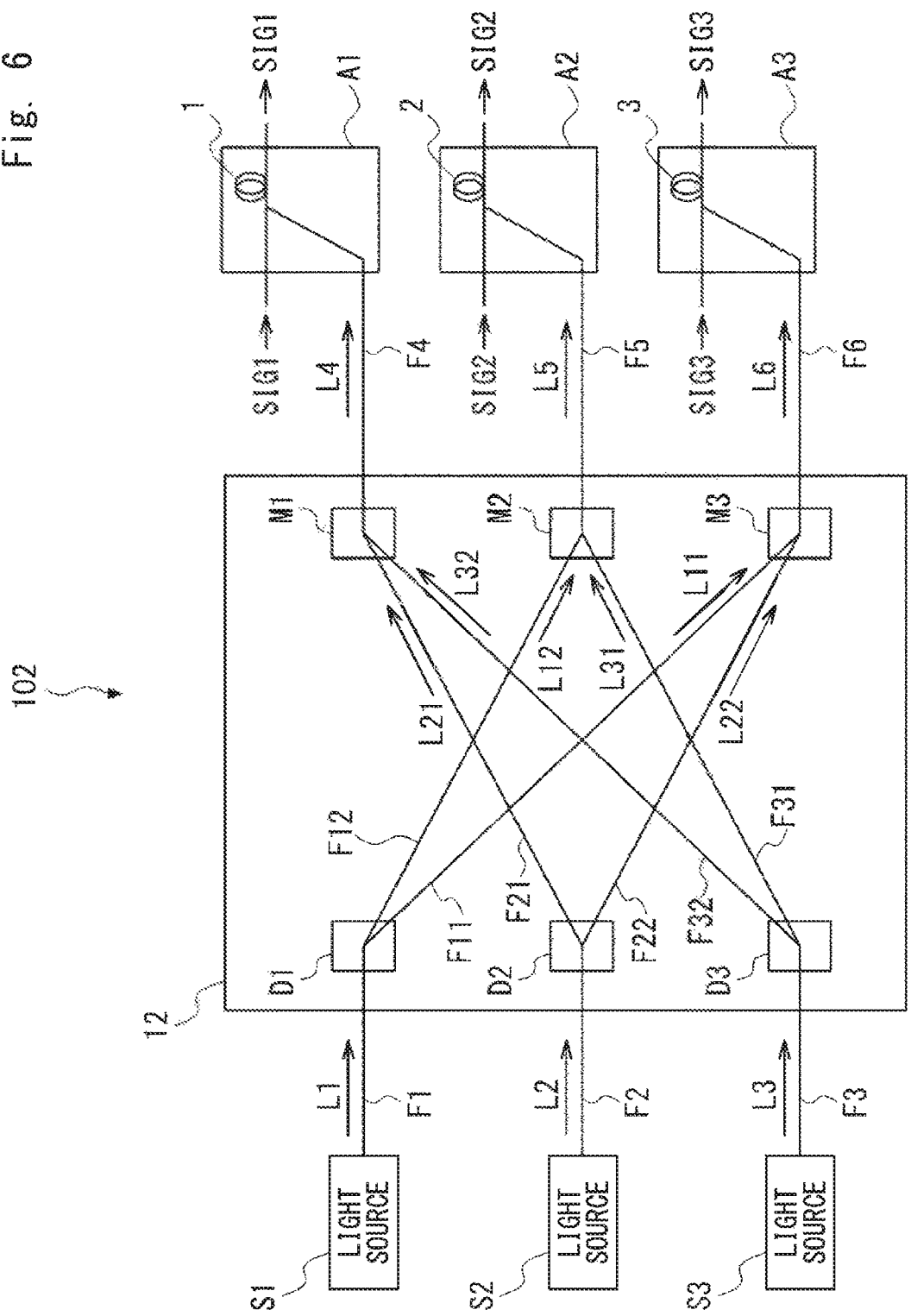
FIG. 6 illustrates a modified example of an arrangement of optical fibers in an optical distribution unit.

Note that the arrangement of the optical fibers in the optical distribution unit 10 illustrated in FIG. 2 is merely an example. As long as each of the optical amplification units A1 to A3 can receive the excitation light generated by multiplexing the lights output from the two different light sources, the arrangement of the optical fibers in the optical distribution unit may be changed as appropriate. FIG. 6 illustrates a modified example of the arrangement of the optical fibers in the optical distribution unit.

In an optical distribution unit 12 in an optical repeater 102 illustrated in FIG. 6, the optical fiber F11 connects the output port of the demultiplexer D1 with the input port of the multiplexer M3. The optical fiber F32 connects the output port of the demultiplexer D3 with the input port of the multiplexer M1. As a result, the excitation light L4 is the light including the branched light L21 and the branched light L32, and the excitation light L6 is the light including the branched light L11 and the branched light L22.

As described above, according to the use of the optical repeater, it is also possible to perform a design in which the wiring of the optical fiber is flexibly changed as appropriate.

Second Example Embodiment

Figure 7:
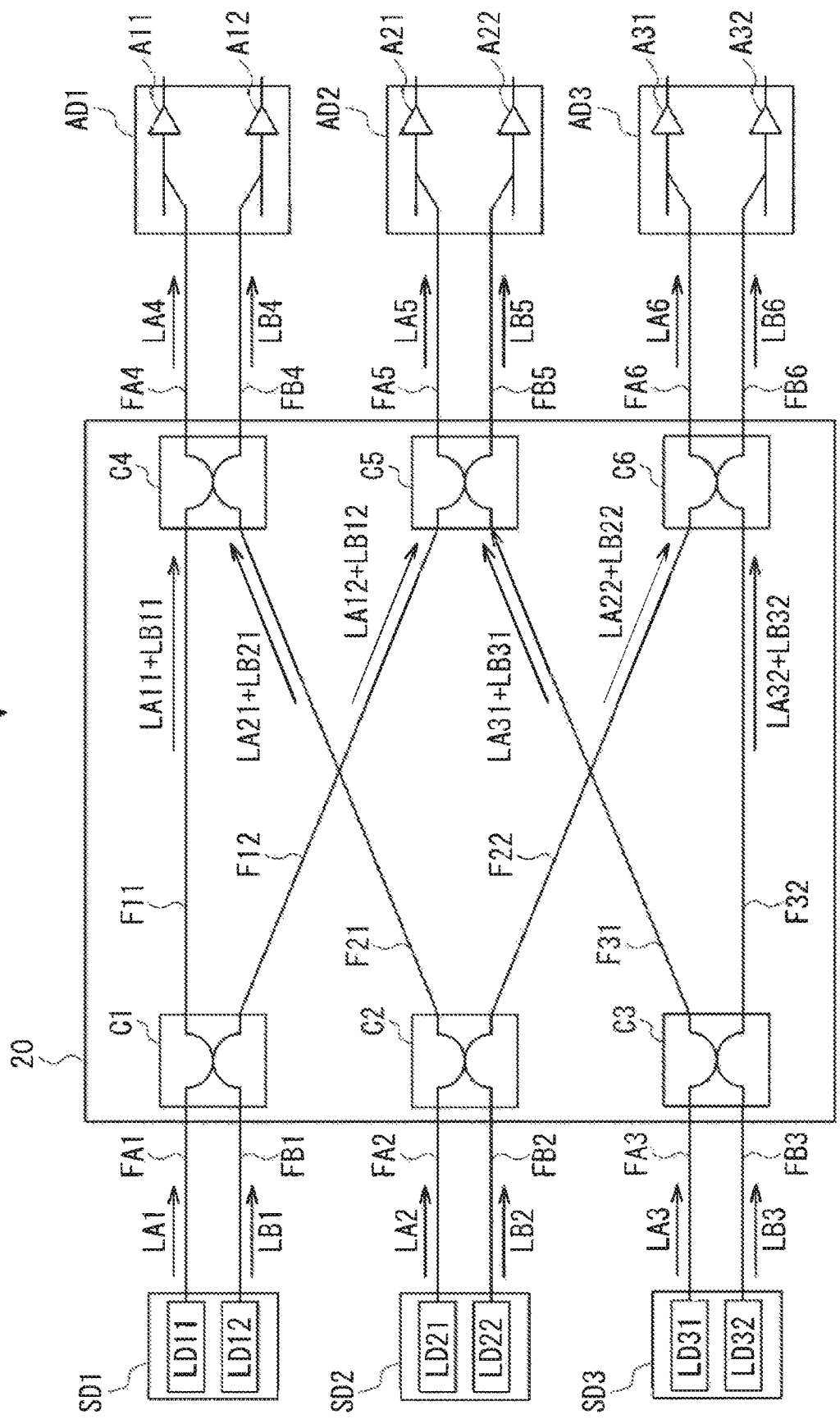
FIG. 7 schematically illustrates a configuration of an optical repeater according to a second example embodiment.

An optical repeater according to a second example embodiment will be described. FIG. 7 schematically illustrates a configuration of an optical repeater 200 according to the second example embodiment. The optical repeater 200 includes light sources SD1 to SD3, an optical distribution unit 20, and optical amplification units AD1 to AD3. The light sources SD1 to SD3 correspond to the light sources S1 to S3 of the optical repeater 100, respectively. The optical amplification units AD1 to AD3 correspond to optical amplification units A1 to A3 of the optical repeater 100, respectively.

The optical distribution unit 20 includes couplers C1 to C6. The couplers C1 to C3 correspond to the demultiplexers D1 to D3 of the optical distribution unit 10, respectively. The couplers C4 to C6 correspond to the multiplexers M1 to M3 of the optical distribution unit 10, respectively.

Each of the couplers C1 to C6 has two input ports and two output ports. Each light input to a first or second input port is branched into two branched lights. One branched light generated by being input to the first input port and branched and one branched light generated by being input to the second input port and branched are multiplexed and output from a first output port. The other branched light generated by being input to the first input port and branched and the other branched light generated by being input to the second input port and branched are multiplexed and output from a second output port.

Each of the light sources SD1 to SD3 has two light emitting elements. Specifically, the light sources SD1 has light emitting elements LD11 and LD12. The light sources SD2 has light emitting elements LD21 and LD22. The light sources SD3 has light emitting elements LD31 and LD32. For example, an element such as a semiconductor laser can be used as each light emitting element.

The light emitting element LD11 outputs a light LA1 to one input port of the coupler C1 through an optical fiber FA1. The light emitting element LD12 outputs a light LB1 to the other input port of the coupler C1 through an optical fiber FB1. The coupler C1 branches the light LA1 into branched lights LA11 and LA12, and branches the light LB1 into branched lights LB11 and LB12. The coupler C1 multiplexes the branched lights LA11 and LB11, and multiplexes the branched lights LA12 and LB12. The multiplexed lights LA11 and LB11 are output from one output port of the coupler C1 to one input port of the coupler C4. The multiplexed lights LA12 and LB12 are output from the other output port of the coupler C1 to one input port of the coupler C5.

The light emitting element LD21 outputs a light LA2 to one input port of the coupler C2 through an optical fiber FA2. The light emitting element LD22 outputs a light LB2 to the other input port of the coupler C2 through an optical fiber FB2. The coupler C2 branches the light LA2 into branched lights LA21 and LA22, and branches the light LB2 into branched lights LB21 and LB22. The coupler C2 multiplexes the branched lights LA21 and LB21, and multiplexes the branched lights LA22 and LB22. The multiplexed lights LA21 and LB21 are output from one output port of the coupler C2 to the other input port of the coupler C4. The multiplexed lights LA22 and LB22 are output from the other output port of the coupler C2 to one input port of the coupler C6.

The light emitting element LD31 outputs a light LA3 to one input port of the coupler C3 through an optical fiber FA3. The light emitting element LD32 outputs a light LB3 to the other input port of the coupler C3 through an optical fiber FB3. The coupler C3 branches the light LA3 into branched lights LA31 and LA32, and branches the light LB3 into branched lights LB31 and LB32. The coupler C3 multiplexes the branched lights LA31 and LB31, and multiplexes the branched lights LA32 and LB32. The multiplexed lights LA31 and LB31 are output from one output port of the coupler C3 to the other input port of the coupler C5. The multiplexed lights LA32 and LB32 are output from the other output port of the coupler C3 to the other input port of the coupler C6.

The couplers C4 to C6 branches the input light and multiplexes the branched lights as described above. As a result, an excitation light LA4 generated by multiplexing the branched lights LA11, LB11, LA21, and LB21 is output from one output port of the coupler C4. An excitation light LB4 generated by multiplexing the branched lights LA11, LB11, LA21, and LB21 is output from the other output port of the coupler C4.

An excitation light LA5 generated by multiplexing the branched lights LA12, LB12, LA31, and LB31 is output from one output port of the coupler C5. An excitation light LB5 generated by multiplexing the branched lights LA12, LB12, LA31, and LB31 is output from the other output port of the coupler C5.

An excitation light LA6 generated by multiplexing the branched lights LA22, LB22, LA32, and LB32 is output from one output port of the coupler C6. An excitation light LB6 generated by multiplexing the branched lights LA22, LB22, LA32, and LB32 is output from the other output port of the coupler C6.

Each of the optical amplification units AD1 to AD3 includes two optical amplifiers. Specifically, the optical amplification unit AD1 includes two optical amplifiers A11 and A12 that include the EDFs. The optical amplification unit AD2 includes two optical amplifiers A21 and A22 that includes the EDFs. The optical amplification unit AD3 includes two optical amplifiers A31 and A32 that includes the EDFs.

The excitation light LA4 is input to the optical amplifier A11 of the optical amplification unit AD1 and the excitation light LB4 is input to the optical amplifier A12 of the optical amplification unit AD1. The excitation light LA5 is input to the optical amplifier A21 of the optical amplification unit AD2 and the excitation light LB5 is input to the optical amplifier A22 of the optical amplification unit AD2. The excitation light LA6 is input to the optical amplifier A31 of the optical amplification unit AD3 and the excitation light LB6 is input to the optical amplifier A32 of the optical amplification unit AD3.

As described above, in the present configuration, even when the light source includes two light emitting elements, the light output from each light emitting element can be branched and the branched lights can be output to the different couplers, respectively. As a result, it can be understood that the light output from one light source is branched and the branched lights are output to the different optical amplification units, respectively, as in the first example embodiment.

In general, in the optical communication, an upstream optical signal and a downstream optical signal are often handled as a pair. Thus, the optical repeater amplifies the optical signals transmitted through a fiber pair configured by an upstream optical fiber and a downstream optical fiber. In this case, by applying one optical amplification unit according to the present example embodiment to one fiber pair, it is possible to easily correspond to an operation per one fiber pair. Note that the fiber pair may correspond to not only the communication direction but also a pair of frequently used bands (e.g. C-band and L-band) or the like.

Figure 8:
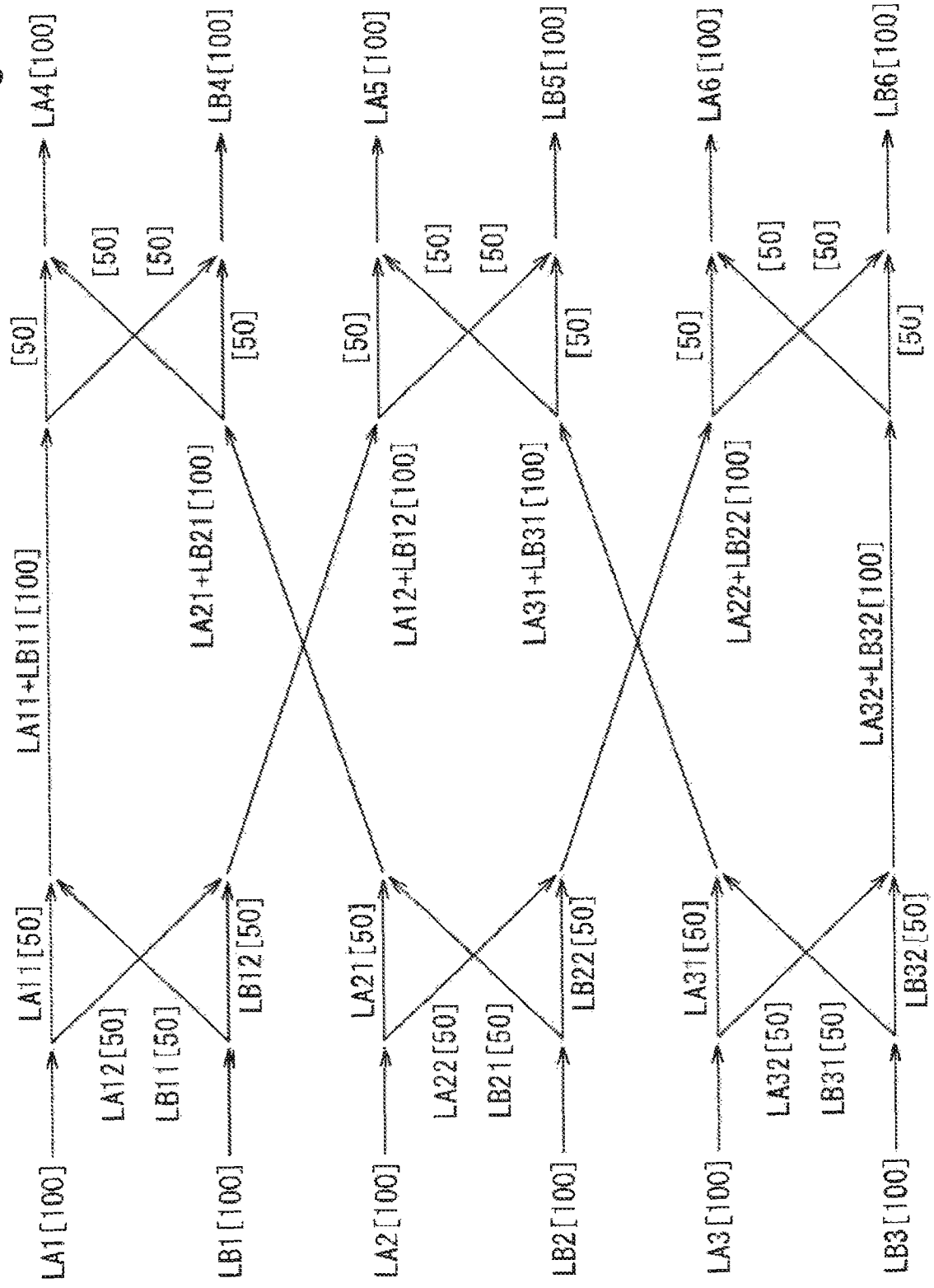
FIG. 8 schematically illustrates light intensities in the optical repeater according to the second example embodiment.

When the light intensities of the lights output from the light emitting elements are the same as each other and the couplers C1 to C6 branch the light at the same rate, the light intensities of the excitation lights output from the couplers C4 to C6 are the same as each other. FIG. 8 schematically illustrates light intensities in the optical repeater 200 according to the second example embodiment. When the light intensities of the light LA1 to LA3 and LB1 to LB3 are "100", the light intensities of the branched lights branched by the couplers C1 to C3 are "50". Thus, the light intensities of the lights output from the output ports of the couplers C1 to C3 are "100".

The light intensities of the lights branched by the couplers C4 to C6 are "50", respectively. Thus, the light intensities of the excitation lights LA4 to LA6 and LB4 to LB6 output from the output ports of the couplers C4 to C6 are "100", respectively. Therefore, the light intensities of the excitation lights LA4 to LA6 and LB4 to LB6 are the same as each other.

Figure 9:
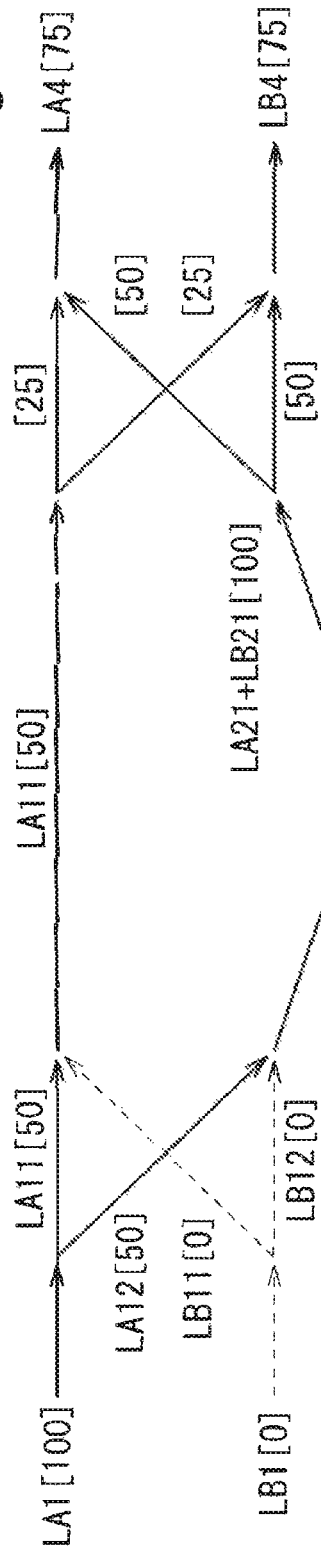
FIG. 9 illustrates an example in which a light emitting element of a light source in the optical repeater according to the second example embodiment fails.

Next, the case in which the light source in the optical repeater 200 fails will be considered. FIG. 9 illustrates an example in which the light emitting element LD12 of the light source SD1 in the optical repeater 200 according to the second example embodiment fails. When the light emitting element LD12 fails and the output of the light LB1 stops, the light intensity of the light LB1 is "0". Thus, only the branched light LA11 whose light intensity is "50" is output from the coupler C1 to the coupler C4 and only the branched light LA12 whose light intensity is "50" is output from the coupler C1 to the coupler C5.

The coupler C4 branches the branched light LA11 into two lights whose light intensities are "25". The coupler C5 branches the branched light LA12 into two lights whose light intensities are "25". As a result, the light intensities of the excitation lights LA4, LB4, LA5, and LB5 are "75".

As described above, according to the present configuration, even when one of the two light emitting elements included in one light source fails, it is possible to continue to output the excitation light to the optical amplification unit while the light intensity of the excitation light is reduced to ¾.

Note that, according to the present configuration, even when the other of the two light emitting elements included in one light source also fails, it is possible to continue to output the excitation light to the optical amplification unit while the light intensity of the excitation light is reduced to ½. Further, according to the present configuration, even when one of the two light emitting elements included in another light source further fails, it is possible to continue to output the excitation light to the optical amplification unit while the light intensity of the excitation light may be reduced to ½. Furthermore, even when three light emitting elements in four light emitting elements included in two light sources fail, it is possible to continue to output the excitation light to the optical amplification unit while the light intensity of the excitation light may be reduced to ¼.

The number of the light emitting elements disposed in the light source is not limited to two, and the number thereof may be three or more. The number of the input ports of the corresponding coupler may be appropriately changed according to the number of the light emitting elements In sum, by disposing a plurality of the light emitting elements in the light source, even when the failure of the light source occurs, it is possible to further reduce the risk of the excitation light being cut off.

Third Example Embodiment

An optical repeater according to a third example embodiment will be described. In the example embodiments described above, it has been described that the demultiplexers D1 to D3 and the couplers C1 to C6 branch the input lights at the same rate and the excitation lights have the same light intensity. However, it can be considered that the light intensities of the excitation lights used by the optical amplification units are different depending on the use application. In the present example embodiment, an optical repeater capable of corresponding to the case in which the light intensities of the excitation lights used by the optical amplification units are different.

Figure 10:
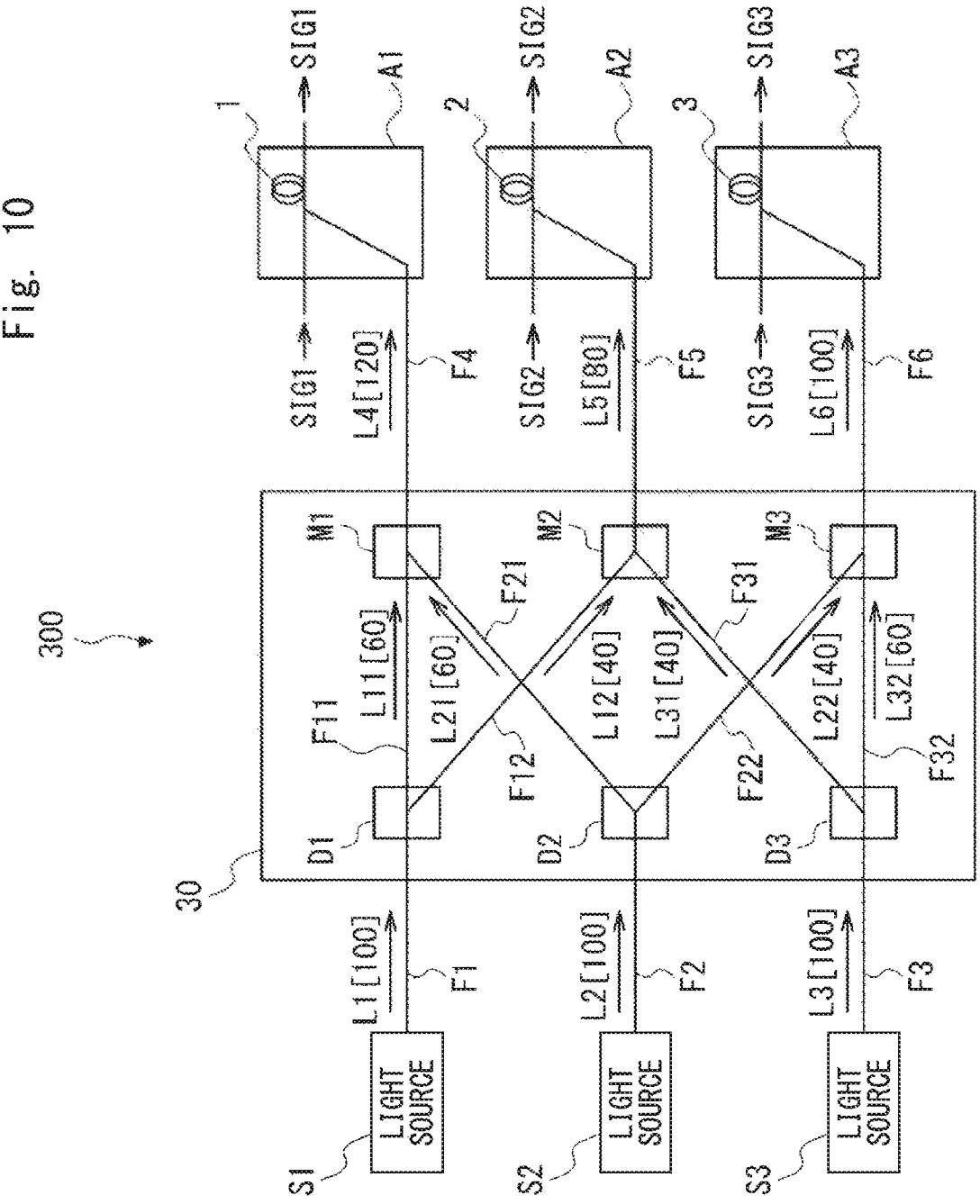
FIG. 10 schematically illustrates a configuration of an optical repeater according to a third example embodiment.

FIG. 10 schematically illustrates a configuration of an optical repeater 300 according to the third example embodiment. The optical repeater 300 has a configuration in which the optical distribution unit 10 in the optical repeater 100 according to the first example embodiment is replaced with an optical distribution unit 30. In the present example embodiment, it is assumed that a required light intensity of the excitation light L4 input to the optical amplification unit A1 is "120". It is also assumed that a required light intensity of the excitation light L5 input to the optical amplification unit A2 is "80". Further, it is assumed that a required light intensity of the excitation light L6 input to the optical amplification unit A3 is "100".

The optical distribution unit 30 has the configuration as the optical distribution unit 10 except that the light branching rates at the demultiplexers D1 to D3 are different from those in the optical distribution unit 10.

The demultiplexer D1 branches the light L1 at different rates. In this example, the demultiplexer D1 branches the light L1 whose light intensity is "100" into the branched light L11 whose light intensity is "60" and the branched light L12 whose light intensity is "40".

The demultiplexer D2 branches the light L2 at different rates. In this example, the demultiplexer D2 branches the light L2 whose light intensity is "100" into the branched light L21 whose light intensity is "60" and the branched light L22 whose light intensity is "40".

The demultiplexer D3 branches the light L3 at different rates. In this example, the demultiplexer D3 branches the light L3 whose light intensity is "100" into the branched light L31 whose light intensity is "40" and the branched light L32 whose light intensity is "60".

Thus, the light intensity of the excitation light L4 is "120", the light intensity of the excitation light L5 is "80", and the light intensity of the excitation light L6 is "100". Therefore, according to the optical repeater 300 illustrated in FIG. 10, it is possible to easily cause the light intensity of the excitation light to be a desired value without increasing the number of components in the optical distribution unit only by changing the light branching rates at the demultiplexer.

Figure 11:
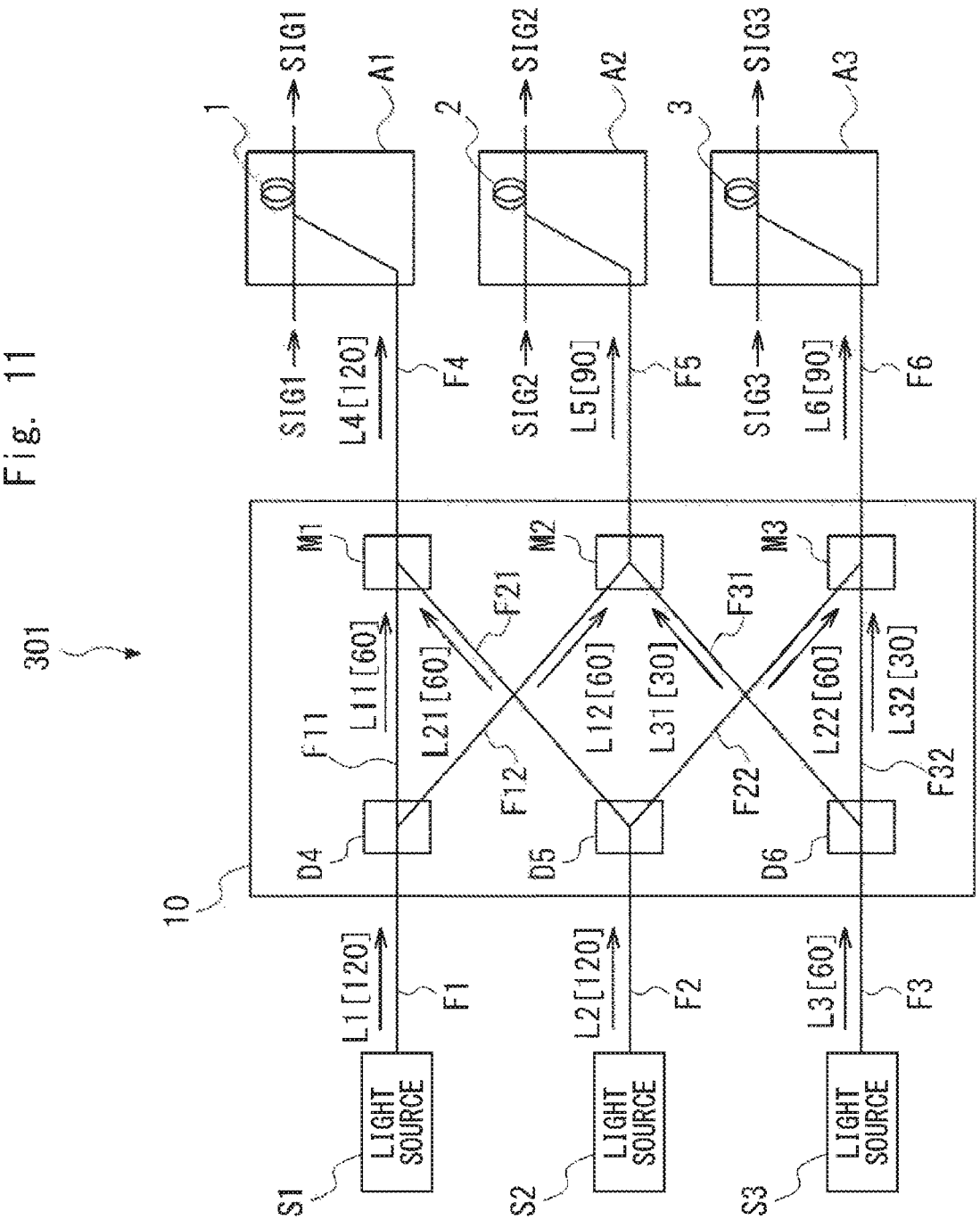
FIG. 11 schematically illustrates a configuration of an optical repeater according to the third example embodiment.

Further, the light intensity of the excitation light can be changed by changing the light intensity of the light output from the light source. FIG. 11 schematically illustrates a configuration of an optical repeater 301 according to the third example embodiment. The configuration of the optical repeater 301 is the same as that of the optical repeater 100 except that the light intensities of the lights output from the light sources S1 to S3 are different. Here, it is assumed that the required light intensities of the excitation lights L4 to L6 are "120", "90", and "90", respectively.

In the present example embodiment, the light intensity of the light L1 is "120", the light intensity of the light L2 is "120", and the light intensity of the light L3 is "60".

Thus, the light intensities of the branched lights L11, L12, L21, and L22 are "60". The light intensities of the branched lights L31 and L32 are "30".

As a result, the light intensity of the excitation light L4 is "120", the light intensity of the excitation light L5 is "90", and the light intensity of the excitation light L6 is "90". Therefore, according to the optical repeater 301 illustrated in FIG. 11, it is possible to easily cause the light intensity of the excitation light to be a desired value without increasing the number of components only by changing the light intensity of the light output from the light source.

For example, when the bands of the optical signals to be amplified are different, it may be necessary to set the light intensities of the excitation lights according to the bands. An example in which a C-band optical signal (1530 nm to 1565 nm) and an L-band optical signal (1565 nm to 1625 nm) are amplified will be described. In general, the optical amplification unit amplifying the L-band optical signal requires a higher intensity excitation light than the optical amplification unit amplifying the C-band optical signal. In this case, as illustrated in FIGS. 10 and 11, it is possible to correspond to amplification of optical signals in different bands by setting the intensities of the excitation lights provided to the optical amplification units. Note that the amplification of the C-band and L-band is merely an example. In sum, it should be appreciated that it is possible to appropriately correspond to amplification of the optical signals in two or more different bands including the C-band and L-band.

It should be appreciated that the change of the light branching rates at the demultiplexer and the change of the light intensity of the light output from the light source may be combined to set the light intensity of the excitation light. Although the coupler has been used as the demultiplexer and multiplexer in the third example embodiment, it should be appreciated that the light branching rates at the coupler may be changed according to the required light intensity of the excitation light.

Fourth Example Embodiment

Figure 12:
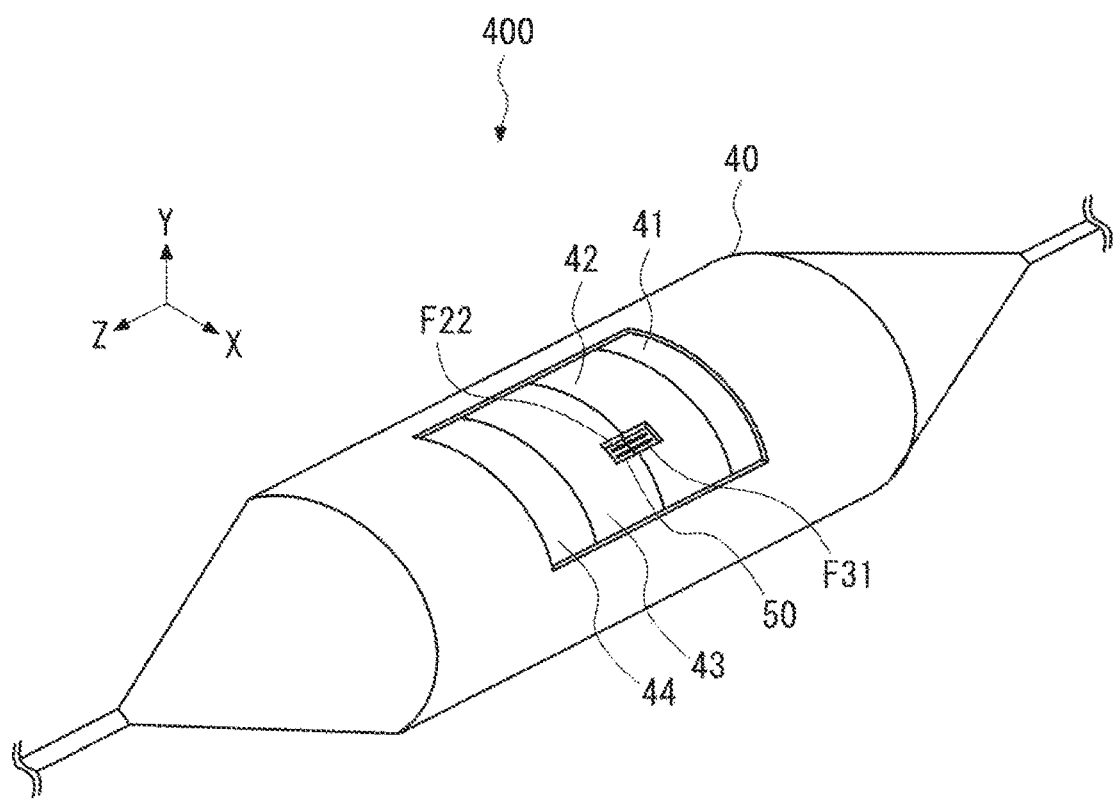
FIG. 12 schematically illustrates a configuration of an optical repeater according to a fourth example embodiment.

An optical repeater according to a fourth example embodiment will be described. Here, an installation of the optical repeater according to the example embodiments described above will be described. FIG. 12 schematically illustrates a configuration of an optical repeater 400 according to the fourth example embodiment. In a case 40 having a cylindrical shape in the optical repeater 400, modules having pillar shapes are arranged in a longitudinal direction of the case 40 (Z-direction in FIG. 12). In FIG. 12, a part of the case 40 is removed to illustrate the modules in the case 40. In this example, as illustrated in FIG. 12, modules 41 to 44 are arranged in the case 40.

Light sources, optical distribution units, and optical amplification units used for relaying the optical signal are installed in the modules 41 to 44.

In this example, the light sources S1 and S2, the demultiplexers D1 and D2, and the optical amplification units A1 and A2 illustrated in FIG. 2 are installed in the module 42. Thus, the optical fibers F1, F2, F4, F5, F11, F12, and F21 are housed in the module 42.

The light source S3, the demultiplexer D3, and the optical amplification unit A3 illustrated in FIG. 2 are installed in the module 43. Thus, the optical fibers F3, F6, and F32 are housed in the module 43.

In this case, the optical fiber F22 is laid between the module 42 and the module 43 to connect the demultiplexer D2 in the module 42 with the multiplexer M3 in the module 43. The optical fiber F31 is laid between the module 42 and the module 43 to connect the demultiplexer D3 in the module 43 with the multiplexer M2 in the module 42. For example, as illustrated in FIG. 12, a groove 50 for guiding the optical fiber is formed on side surfaces of the modules 42 and 43. The optical fibers F22 and F31 are housed in the groove 50.

As described above, even when the components constituting the optical repeater 100 illustrated in FIG. 2 are dispersedly installed in the different optical modules, it can be understood that the optical repeater can be configured by connecting the modulus with the optical fibers. Note that it should be appreciated that the same applies to the case in which the components constituting the optical repeater according to the second and third example embodiments are dispersedly installed in the different modules.

The shape of the case described above is merely an example and it may be another shape other than the cylindrical shape. Although the modules are arranged in the longitudinal direction of the case, the arrangement of the modules is not limited to this.

Other Example Embodiments

Note that the present disclosure is not limited to the example embodiments mentioned above and can be modified as appropriate without departing from the gist of the present disclosure. For example, in the example embodiments described above, although it has been described that the optical components disposed in the optical repeater are connected by the optical fibers, it is merely an example. A part or all of the optical fibers connecting the optical components disposed in the optical repeater may be an optical waveguide other that the optical fiber.

Although the light source includes two light emitting elements in the second example embodiment, it may include three or more light emitting elements. In this case, the coupler connected with one light source may branch the light output from each of two or more light emitting elements at the same rate or the different rates. Further, the light intensities of the lights output from the two or more light emitting elements may be the same or different according to the required light intensities of the excitation lights.

Although the light amplification unit includes two optical amplifiers in the second example embodiment, it may include three or more optical amplifiers. In this case, the coupler connected with one optical amplification unit may branch the multiplexed light at the same rate or the different rates and respectively output the branched lights to tow or more optical amplifiers.

It should be appreciated that a manufacturing method of the optical repeater according to the example embodiments described above can be achieved by disposing the light source and the optical amplification unit descried in the above-described example embodiments and disposing the optical distribution unit descried in the above-described example embodiments. Further, it should be appreciated that a relay method of the optical signal can be achieved by applying the optical repeater and amplifying the optical signal.

When the light source fails in the optical repeater according to the example embodiments described above, the light intensity of the light output from the light source that does not fail may be increased within an allowable range so as to maintain the light intensity of the excitation light. In this case, a control unit may be disposed in the optical repeater, and the control unit may detect the failure of the light source and control the light source that does not fail. Thus, the light intensities of the excitation lights L1 to L3 can be kept within a desired range.

Figure 13:
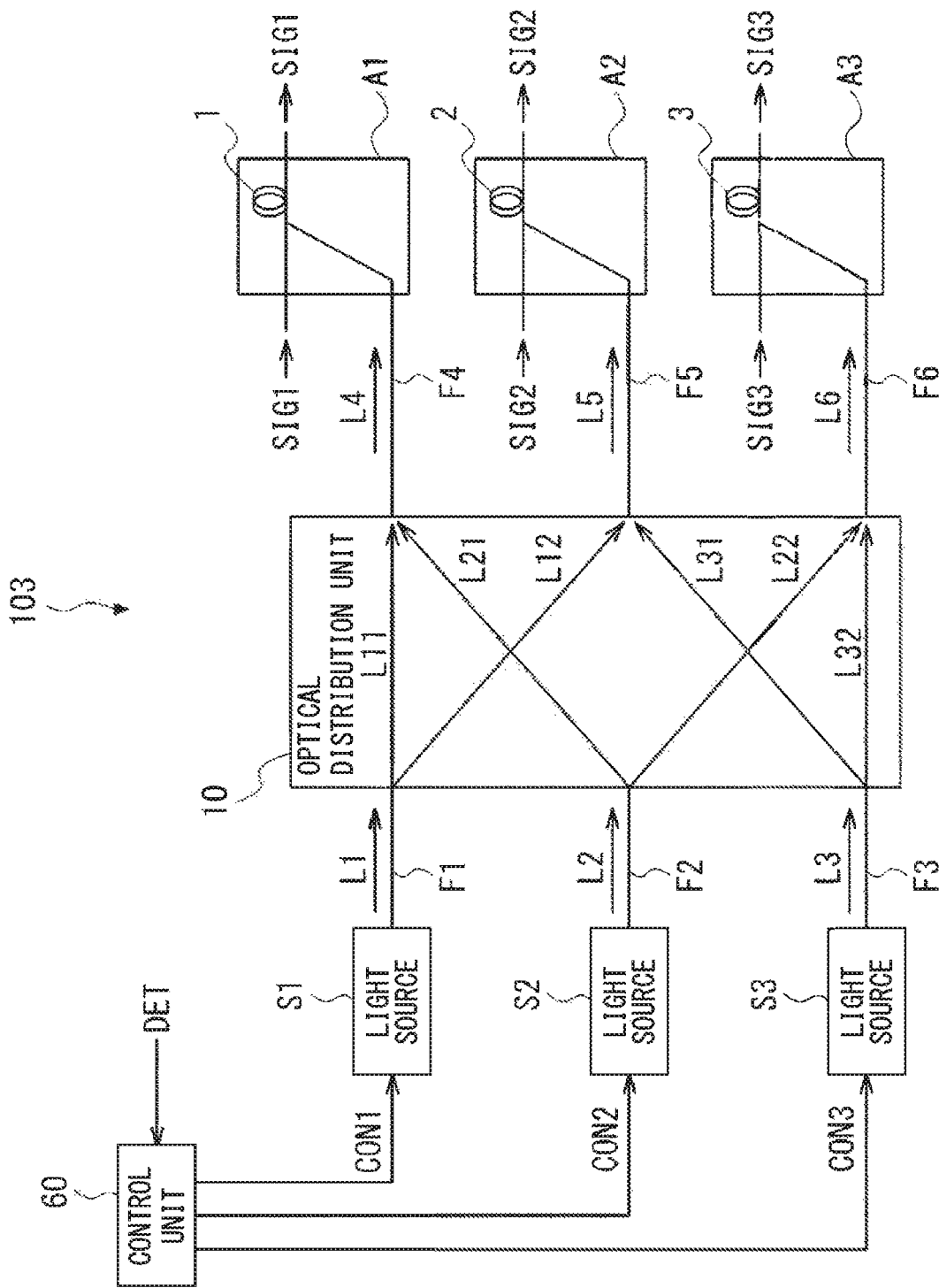
FIG. 13 illustrates an alternative example of the optical repeater.

FIG. 13 illustrates an alternative example of the optical repeater according to example embodiments described above. The optical repeater illustrated in FIG. 13 had a configuration in which a control unit 60 is added to the optical repeater 100 according to the first example embodiment. The control unit 60 can receive a failure detection signal DET and detect the failure of the light source. The control unit 60 can control the light intensities of the lights output from the light sources that do not fail in the light sources S1 to S3 by using control signals CON1 to CON3 in response to the failure detection result, respectively. The failure detection signal DET may be provided from a determination unit that determines an occurrence of the failure of the light source to the control unit 60. This determination unit may be disposed in the optical repeater or the outside thereof. The light source may detect the failure and output the failure detection signal DET to the control unit 60.

The optical amplifier and the optical amplification unit including the EDF have been described above, the optical amplifier and the optical amplification unit may include a rare-earth doped fiber other than the EDF.

The present disclosure has been described above with reference to the example embodiments, however, the present disclosure is not to be limited to the aforementioned disclosure. The configuration and the details of the present disclosure can be modified in various ways within the scope that is understandable by a person skilled in the art.

This application is based upon and claims the benefit of priority from Japanese patent application No. 2018-45417, filed on Mar. 13, 2018, the disclosure of which is incorporated herein in its entirety by reference.

Reference Signs List

1 TO 3 EDFS
60 CONTROL UNIT
10, 11, 12, 20, 30 OPTICAL DISTRIBUTION UNITS
40 CASE
41 TO 44 MODULES
50 GROOVE
100, 101, 102, 103, 200, 300, 301, 400 OPTICAL REPEATERS
A1 TO A3, AD1 TO AD3 OPTICAL AMPLIFICATION UNITS
A11, A12, A21, A22, A31, A32 OPTICAL AMPLIFIERS
C1 TO C6 COUPLERS
D1 TO D6 DEMULTIPLEXERS
F1 TO F6 OPTICAL FIBERS
F11, F12, F21, F22, F31, F32, FA1 TO FA3, FB1 TO FB3 OPTICAL FIBERS
L1 TO L3, LA1 TO LA3, LB1 TO LB3 LIGHTS
L11, L12, L21, L22, L31, L32, LA11, LA12, LA21, LA22, LA31, LA32,
LB11, LB12, LB21, LB22, LB31, LB32 BRANCHED LIGHTS
L4 TO L6, LA4 TO LA6, LB4 TO LB6 EXCITATION LIGHTS
LD11, LD12, LD21, LD22, LD31, LD32 LIGHT EMITTING ELEMENTS
SIG1 TO SIG3 OPTICAL SIGNALS

The invention claimed is:

1. An optical repeater comprising:
three or more light sources configured to output lights;
three or more optical amplifiers configured to amplify optical signals using input excitation lights; and
an optical distributor configured to branch the light output from each of the three or more light sources into two branched lights and distribute the branched lights in such a manner that each of the three or more optical amplifiers receives the branched lights branched from the lights output from two different light sources as the excitation light, wherein
the optical distributor comprises:
three or more demultiplexers configured to respectively receive the lights output from the three or more light sources and configured to each branch the received light into the two branched lights; and
three or more multiplexers configured to each receive the branched lights output from two different demultiplexers included in the three or more demultiplexers and output the excitation light obtained by multiplexing the received branched lights to any one of the three or more optical amplifiers.

2. The optical repeater according to claim 1, wherein the three or more demultiplexers are each configured as a Y-branch that branches the received light at a same rate or at a different rate into the two branched lights, and
the three or more multiplexers are each configured as a Y-branch that multiplexes the received branched lights to output the excitation light.

3. The optical repeater according to claim 1, wherein
each of the three or more light sources comprises a plurality of light emitting elements,
each of the optical amplifiers comprises a plurality of amplifiers that amplify the optical signals using the input excitation lights,
the three or more demultiplexers are each configured as a coupler that branches the received lights at a same rate or at a different rate in such a manner that the light output from each light emitting element is included in each of the two branched lights, and
the three or more multiplexers are each configured as a coupler that multiplexes the received branched lights, branches the multiplexed light into two or more excitation lights at a same rate or at a different rate, and outputs the two or more excitation lights to the amplifiers in any one of the optical amplifiers.

4. The optical repeater according to claim 1, further comprising a controller configured to control the three or more light sources, wherein
when any of the three or more light sources fails and the output of the light therefrom is stopped, the controller adjusts a light intensity of the light output from each light source that does not fails that has not failed so as to maintain the light intensities of the input excitation lights units within a desired range.

5. A manufacturing method of an optical repeater comprising:
disposing three or more light sources configured to output lights;
disposing three or more optical amplifiers configured to amplify optical signals using input excitation lights, and
disposing an optical distributor between the three or more light sources and the three or more optical amplifiers, the optical distributor configured to branch the light output from each of the three or more light sources into two branched lights and distribute the branched lights in such a manner that each of the three or more optical amplifiers receives the branched lights branched from the lights output from two different light sources as the excitation light, wherein
the optical distributor comprises:
three or more demultiplexers configured to respectively receive the lights output from the three or more light sources and configured to each branch the received light into the two branched lights; and
three or more multiplexers configured to each receive the branched lights output from two different demultiplexers included in the three or more demultiplexers and output the excitation light obtained by multiplexing the received branched lights to any one of the three or more optical amplifiers.

6. A relay method of an optical signal comprising:
by each of three or more demultiplexers, branching lights output from three or more light sources into two branched lights; and by each of three or more multiplexers, multiplexing the branched lights output from two different demultiplexers included in the three or more demultiplexers and outputting multiplexed light to any one of three or more optical amplifiers, wherein each of the three or more optical amplifiers amplifies an optical signal using the multiplexed light output thereto as input excitation light.

\* \* \* \* \*